(12) United States Patent
Chapin

(10) Patent No.: US 7,427,356 B2
(45) Date of Patent: Sep. 23, 2008

(54) FATS, OIL AND GREASE INTERCEPTOR

(76) Inventor: Peter Chapin, 143 Pennwood Dr., Greentown, PA (US) 18426

( * ) Notice: Subject to any disclaimer, the term of this patent is extended or adjusted under 35 U.S.C. 154(b) by 207 days.

(21) Appl. No.: 11/468,205

(22) Filed: Aug. 29, 2006

(65) Prior Publication Data
US 2007/0045182 A1  Mar. 1, 2007

Related U.S. Application Data

(60) Provisional application No. 60/713,462, filed on Sep. 1, 2005.

(51) Int. Cl.
C02F 3/00 (2006.01)

(52) U.S. Cl. .............. 210/601; 210/320; 210/532.1; 210/538

(58) Field of Classification Search ........ 210/320, 210/532.1, 538, 601
See application file for complete search history.

(56) References Cited

U.S. PATENT DOCUMENTS

| | | | | |
|---|---|---|---|---|
| 4,051,024 A | | 9/1977 | Lowe et al. | |
| 4,268,396 A | | 5/1981 | Lowe | |
| 4,855,065 A | * | 8/1989 | Keeter et al. | 210/776 |
| 5,030,357 A | | 7/1991 | Lowe | |
| 5,133,881 A | | 7/1992 | Miller et al. | |
| 5,340,469 A | * | 8/1994 | Montgomery | 210/96.1 |
| 5,637,221 A | | 6/1997 | Coyne | |
| 6,800,195 B1 | | 10/2004 | Batten et al. | |
| 6,878,270 B1 | | 4/2005 | Batten et al. | |
| 7,060,179 B1 | | 6/2006 | Batten et al. | |
| 7,288,187 B1 | * | 10/2007 | Bovaird | 210/143 |
| 2003/0201226 A1 | | 10/2003 | Kelly | |

* cited by examiner

Primary Examiner—Chester T. Barry
(74) Attorney, Agent, or Firm—Mitchell A. Smolow

(57) ABSTRACT

The present invention comprises a gravity draining automatic FOG interceptor with solids removal capability used as a first stage in the treatment of gray water. A preferred embodiment comprises a multi compartment container, the compartments separated by baffles, having a serviceable solids strainer in a first compartment, a second compartment having a cogged belt for FOG removal and collection, a third compartment for collection of clarified effluent, and a fourth compartment for tertiary treatment of the gray water effluent, for example, the introduction of biotechnology. The unique baffle configuration prevents biotechnology backflow migration from the fourth compartment with resulting bacterial contamination of the FOG.

21 Claims, 5 Drawing Sheets

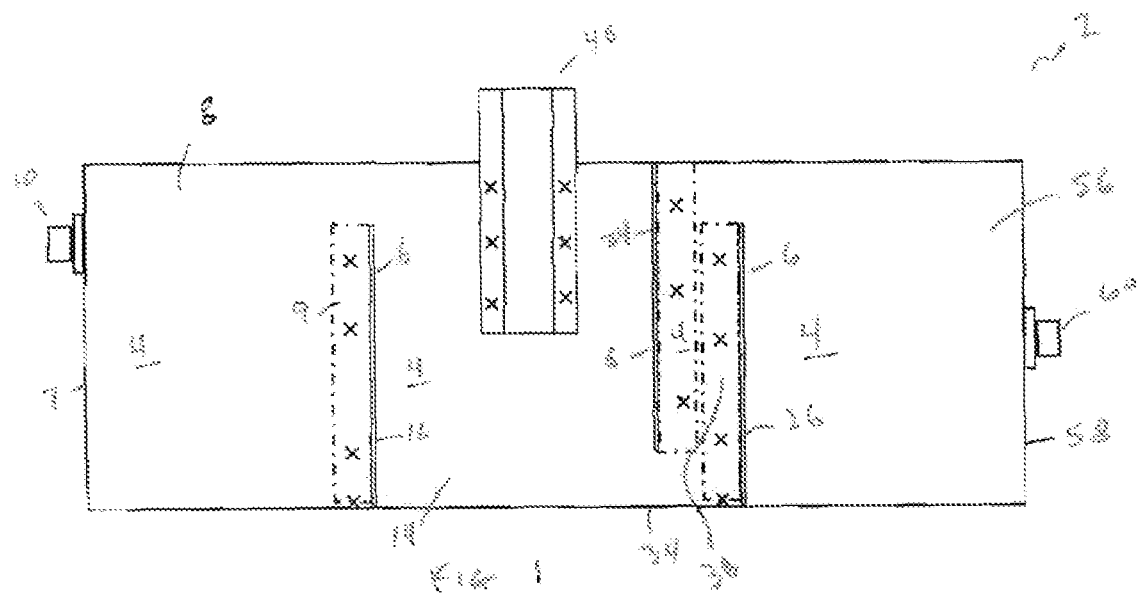
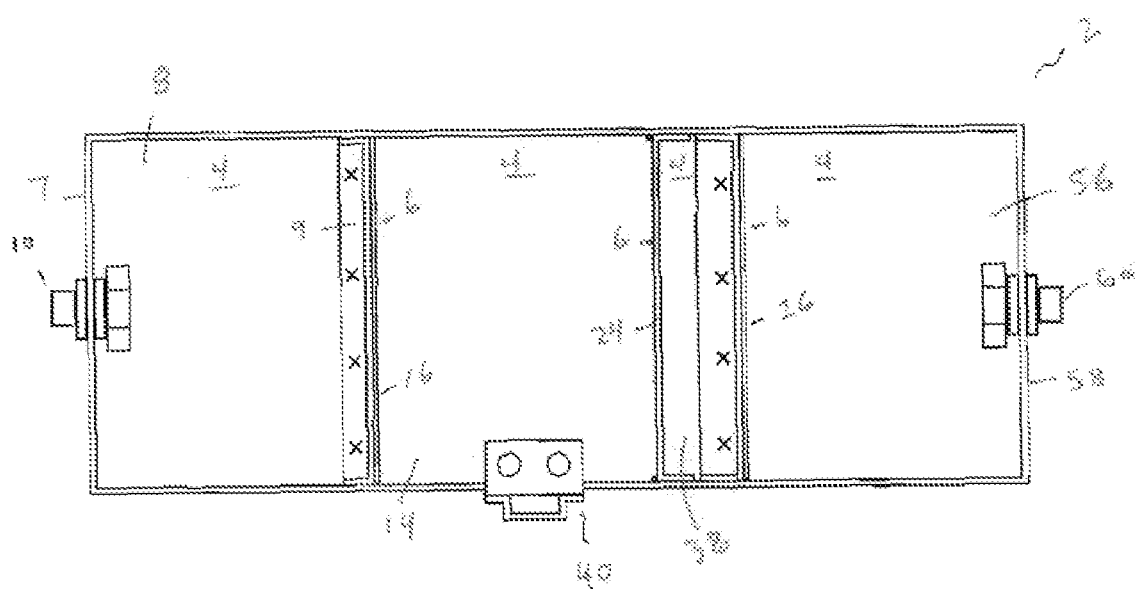

FATS, OIL AND GREASE INTERCEPTOR

CROSS REFERENCE TO RELATED APPLICATIONS

This application claims benefit of provisional U.S. application No. 60/713,462 filed Sep. 1, 2005.

FIELD OF THE INVENTION

The present invention relates generally to removal of food preparation contaminants from wastewater and in particular, to removal and collection of wastewater fats, oils, and grease, henceforth referred to as FOG, from food source and food service facilities.

BACKGROUND OF THE INVENTION

Wastewater FOG is produced by, for example, meat fats in food scraps, cooking oil, shortening, lard, butter and margarine, gravy, and food products such as mayonnaise, salad dressings, and sour cream. Wastewater from food source and food service facilities such as restaurants, processing plants, cruise lines and cargo ships, factories, garages, hotels, and casinos are often referred to as "gray water". When gray water passes through sewer systems, FOG accumulates inside the pipes eventually restricting the flow in the pipes with the potential of causing untreated wastewater to back up into businesses and homes, resulting in high costs for cleanup and restoration. FOG, discharged into septic systems and drain fields can cause malfunctions, resulting in more frequent tank pump-outs and other expenses. Additionally, manholes can overflow into parks, yards, streets, and storm drains, allowing wastewater to contaminate local waters, including drinking water.

Exposure to untreated wastewater is a public-health hazard. Every year, communities spend significant sums unplugging or replacing grease-blocked pipes, repairing pump stations, and cleaning up costly and illegal wastewater spills. If a blockage can be attributed to a particular business, these communities may charge the business for the repair of the sewer pipes and the spill cleanup. In addition, communities often add a surcharge to wastewater bills if a business exceeds a specified discharge limit. These expenses can be significant.

In response, businesses attempt to reduce their FOG discharge through the use of, for example, grease traps. However, it is not practical to pump grease traps on a continual basis. Even if a grease trap is pumped on a monthly or weekly basis, in that time, significant portions of the grease will break down and turn septic. Not only does the grease have an offensive smell, but it will sink and pass out of the grease trap adding to the BOD (Biochemical Oxygen Demand) at the local sewer plant or contaminate and foul sand mounds or fields of on lot systems.

With the ever increasing cost of petroleum based fuel, biodiesel fuel is taking a more prominent role. For purposes of this application, biodiesel fuel refers to a diesel-equivalent processed fuel derived from biological sources such as monoalkyl esters of long chain fatty acids derived from vegetable oils or animal fats. Biodiesel may be used as a pure fuel or blended with petroleum in any percentage. FOG removed from gray water can serve as an important and easily obtained biological source for the production of biodiesel fuel, thereby reducing dependence on fossil fuels while simultaneously reducing stress on public and private sewage systems. FOG is also used in the manufacture of cosmetics, animal feeds and detergents.

Known FOG removal systems such as those disclosed in U.S. Pat. Nos. 5,030,357; 4,268,396; and 4,051,024, assigned to Lowe Engineering, Friedens, Pa. and U.S. Pat. Nos. 6,878,270; 6,800,195; and 5,133,881 assigned to Thermaco, Inc., Asheboro, N.C. utilize a polyethylene revolving wheel and a wiper blade with polyethylene scraper blades, to remove FOG, which has an affinity for polyethylene. One significant disadvantage of such systems is that the wheel and blades as taught need continuous maintenance and replacement.

Accordingly, there is still a continuing need for improved FOG removal and collection system designs. The present invention fulfills this need and further provides related advantages.

BRIEF SUMMARY OF THE INVENTION

The present invention comprises a gravity draining automatic FOG interceptor with solids removal capability used as a first stage in the treatment of gray water. A first embodiment comprises a multi compartment container, the compartments separated by baffles, having a serviceable solids strainer in a first compartment, a second compartment having a FOG collection and removal device, a third compartment for collection of clarified effluent, and a fourth compartment for tertiary treatment of the gray water effluent, for example, the introduction of biotechnology. The unique baffle configuration prevents biotechnology backflow migration from the fourth compartment with resulting bacterial contamination of the FOG.

A second preferred embodiment incorporates an additional FOG collection compartment.

The present invention also contemplates a method of removing and collecting FOG utilizing the novel interceptor.

One advantage of the present invention is that it requires far less maintenance than known technology.

A second advantage of the present invention is that the novel baffle and/or modular configuration allows for early introduction of tertiary treatment such as biotechnology resulting in an effluent which places significantly less stress on both public and private sewer systems.

Yet another advantage of the novel configuration is that biotechnology free FOG is collected which may then be used in the manufacture of biodiesel.

Yet another advantage is the cost savings to both public and private entities that result from such cleaner effluent.

Other features and advantages of the present invention will be apparent from the following more detailed description of the preferred embodiments, taken in conjunction with the accompanying drawings which illustrate, by way of example, the principles of the invention.

BRIEF DESCRIPTION OF THE DRAWINGS

FIG. 1 is a side view of the first embodiment.

FIG. 2 is a top view of the first embodiment.

DETAILED DESCRIPTION OF THE INVENTION

Figure 3:
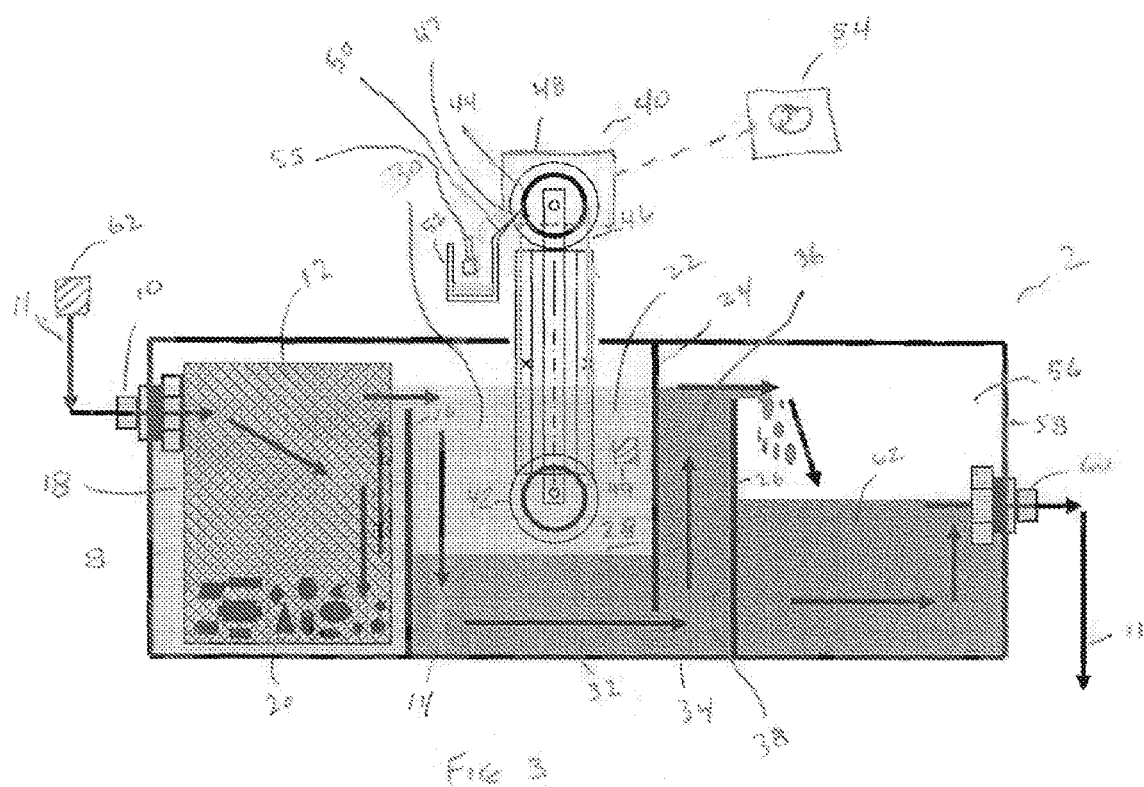
FIG. 3 is a side view of a cogged belt skimmer attached to the second compartment.

Referring now to FIGS. 1 through 3, in a first preferred embodiment, the present invention comprises a container 2 having a plurality of compartments 4 separated by baffles 6.

Bold arrows 11 in FIG. 3 depict effluent flow patterns. Interior of container 2 and baffles 6 are manufactured from any liquid impervious, biotechnology static material. As used herein, "bio-technology static material" refers to any material that does not allow growth and migration of biologic material, described in more detail below.

Baffles 6 are mounted, for example, soldered or welded at an L fold 9, within container 2, forming liquid impervious barriers. Preferably, container 2 is a four compartment stainless steel square or rectangular tank, each compartment 4 separated from one another by a stainless steel baffle 6. As used herein, the term "weir baffle" refers to a baffle which allows liquid to overflow the top of the baffle upon reaching a predetermined pool depth.

Waste effluent and solids from, for example, a sink drain, floor drain, steamer or dishwasher, enter first compartment 8 through inlet 10, located on container first end wall 7 such that waste effluent and solids must pass through solid material collector 12 before entering second compartment 14. Solid material collector 11 is contained within first compartment 8 and has an effluent porous geometry to effectuate collection and disposal of effluent gross solid material 20. It is preferably removable, for example, a removable strainer basket, most preferably a removable polypropylene or aluminum strainer basket.

First weir baffle 16 forms a dividing wall to separate first 8 and second 14 compartments. It is positioned such that incoming waste effluent forms waste effluent pool 18 in first compartment 8. Waste effluent pool 18 effectuates settling out of waste effluent gross solid material 20 into solid material collector 12 for subsequent operator removal. The resulting gross solid material free FOG effluent 22 overflows first weir baffle 16 into second compartment 14. Preferably, solid material collector 12 extends above first weir baffle 16, so that if it becomes clogged it acts as a weir, thereby maintaining effective flow patterns for FOG separation, described in detail below.

Second compartment 14, used to contain and collect gross solid material free FOG effluent 22, is formed by first weir baffle 16 at its inflow end and containment baffle 24 at its outflow end. First weir baffle 16 and second weir baffle 26 create FOG effluent pool 28 within second compartment 14, allowing FOG 30 to gravity-separate from heavier clarified non-FOG effluent 32. Optionally, liquid heating element 49 is positioned and affixed within second compartment 14 in conventional fashion to promote FOG 30 separation. Devices to heat a liquid bath, their attachment within a bath and their electrical connection are well known and need not be described in detail herein. Containment baffle 24 does not extended to container floor 34 thereby permitting clarified non-FOG effluent 36 to pass into third compartment 38 while containing separated FOG 30 within second compartment 14.

Referring to FIG. 3, at least one skimmer 40, for example, a cogged belt skimmer wheel skimmer, rope skimmer, drum skimmer or combinations thereof, extends below first weir baffle 16 to automatically, remove separated FOG 30. In a preferred embodiment, cogged belt skimmer 40 of known design having fixed tail pulley 42, cogged pulley 44, cogged belt 46 and motor assembly 48, such as the Mini-Skimmer manufactured by Wayne Products, Inc., Frazer, Pa., is mounted in known fashion, for example, using an L bracket within second compartment 14.

Separated FOG 30 is carried by cogged belt 46 out of second compartment 14, removed from cogged belt 46 using blade 47 in known fashion, and deposited onto FOG discharge chute 50 for transfer to FOG collection container 52. Preferably, cogged belt 46 extends at least six inches below first weir baffle 16. FOG 30 may be deposited directly from discharge chute 50 into collection container 52, or it may be transferred for example, via a hose (not shown) into a remotely located collection container 52. In a preferred embodiment, cogged belt is fabricated from a material having an affinity to collect FOG 30, for example, a steel reinforced polyurethane belt or a stainless steel belt.

Motor assembly 48 is powered by conventionally electrical connection. Optional timer 54 bay be placed in conventional electrical connection between motor assembly 48 and the power source to allow for predetermined intermittent FOG removal. Optionally, switch 55, for example, a float switch is located in FOG collection container 52, operatively connected to skimmer 40 in known fashion to turn skimmer 40 off when FOG collection container 52 becomes full.

Third compartmental 38 is formed by containment baffle 24 at its inflow end and second weir baffle 26 at its outflow end. Second weir baffle 26 creates FOG effluent pool 28 within third compartment 38 and serves as a barrier to prevent migration of biotechnology contained within fourth compartment 56 into other compartments Preferably, top of second weir baffle 26 is lower than top of first weir baffle 16 (depicted in FIG. 5). The height differentiation between the weir baffles 16, 26 creates a stronger eddy effect in second compartment 14 yielding more effective separation of FOG.

Forth compartment 56 is formed by second weir baffle 26 at its inflow end and container second end wall 58 at its outflow end. Outlet 60 is positioned on container second end wall 58 below inlet 10 to create positive gravity drainage of clarified effluent and at the same time create tertiary, for example, biotechnology, treatment pool 62. Outlet 60 connects in conventional manner to sewage wastewater piping (not shown) for transfer of clarified effluent for final public or private waste water treatment. The one-way effluent gravity flow from the higher entry of inlet 10 into first compartment 8 from the lower exit of outlet 60 from fourth compartment 56 prevents biotechnology back-flow and contamination of the entire system.

Inlet 10 and outlet 60 are sized to effectuate a flow rate such that tertiary treatment pool 62 remains below the top of second weir baffle 26 to prevent migration of biotechnology. Optional flow restrictor 62, for example, a gate valve or ball valve, is placed upstream of inlet 10 to further control flow rate. As described earlier, second weir baffle 26 is manufactured from biotechnology static material, for example, stainless steel. Prevention of biotechnology migration from fourth compartment 56 to other compartments is important so that reclaimed FOG 30 remains free of biotechnology, particularly important when reclaimed FOG 30 is to be used as a biological source for biodiesel.

Biotechnology of the tertiary treatment comprises, for example, introduction of known bacterial microbes that reduce the BOD demand at the final public or private treatment facility. Such microbes include for example, facultative microbes and enzymes such as those produced by Bio-Solutions, Inc. of Hattiesburg, Miss. Cover 66 is removably mounted to container 2 in, for example, the "shoebox" manner displayed in FIG. 5.

In a second preferred embodiment, FOG collection compartment 70 is incorporated into container 2 utilizing containment barrier 72. Unlike containment baffle 24, containment barrier 72 is affixed to container floor 34 and rises to a height sufficient to completely block effluent passage. In all other respects, the second embodiment incorporates the features described in the first embodiment.

Figure 4:
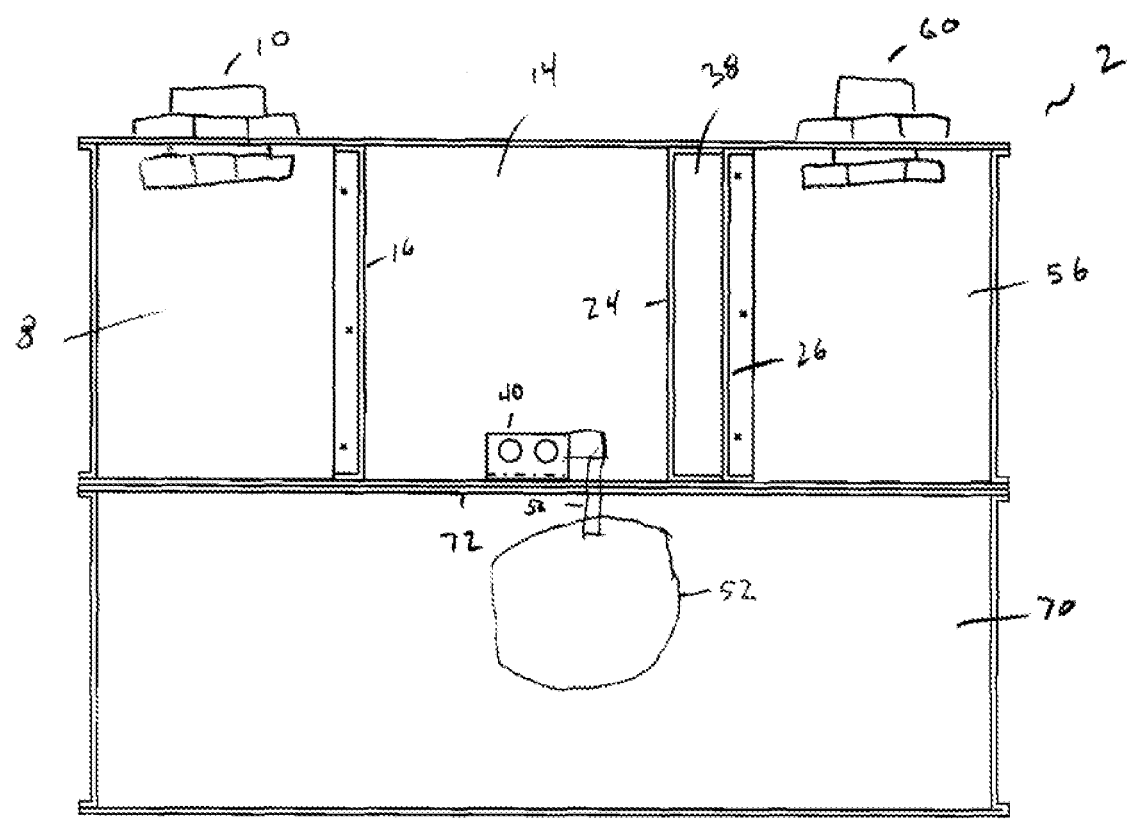
FIGS. 4, 6 and 7 are top views of various arrangements of the five compartments of the second embodiment.
Figure 5:
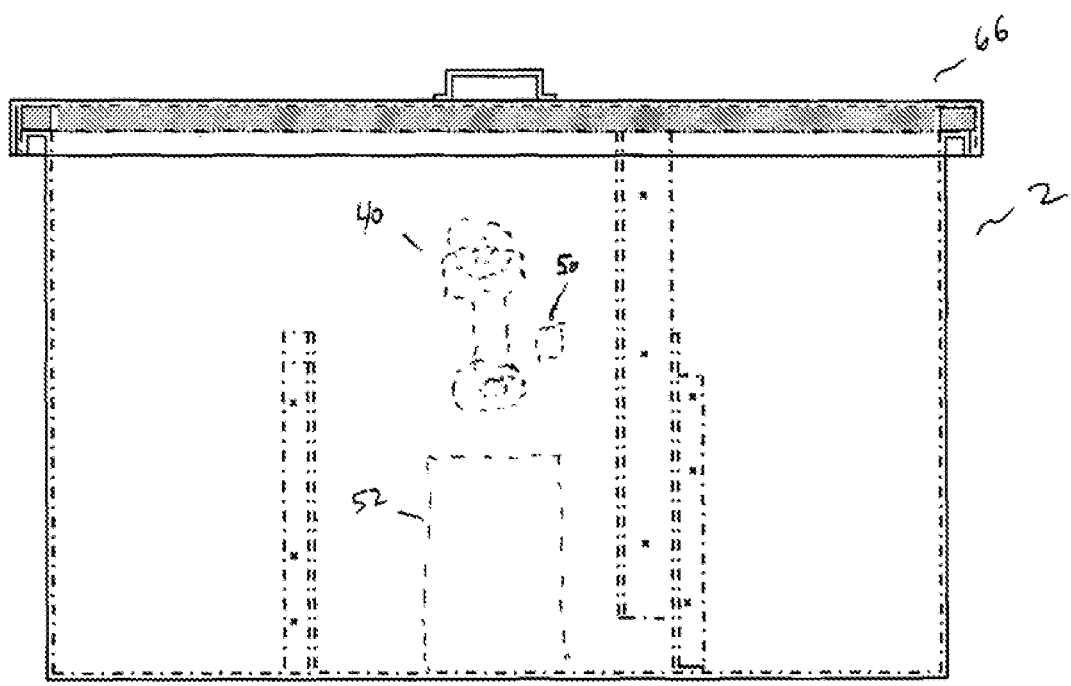
FIG. 5 is a side view of the second embodiment depicted in FIG. 4.
Figure 6:
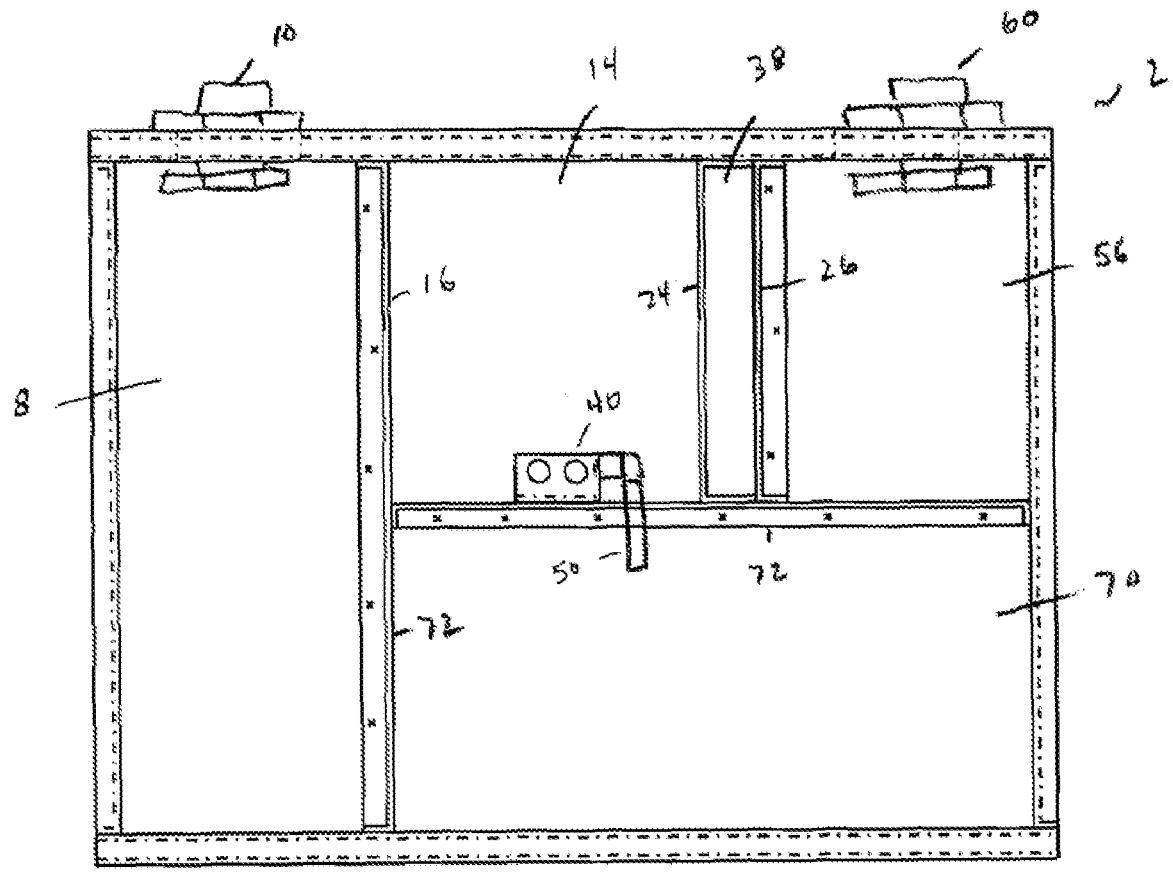
Figure 7:
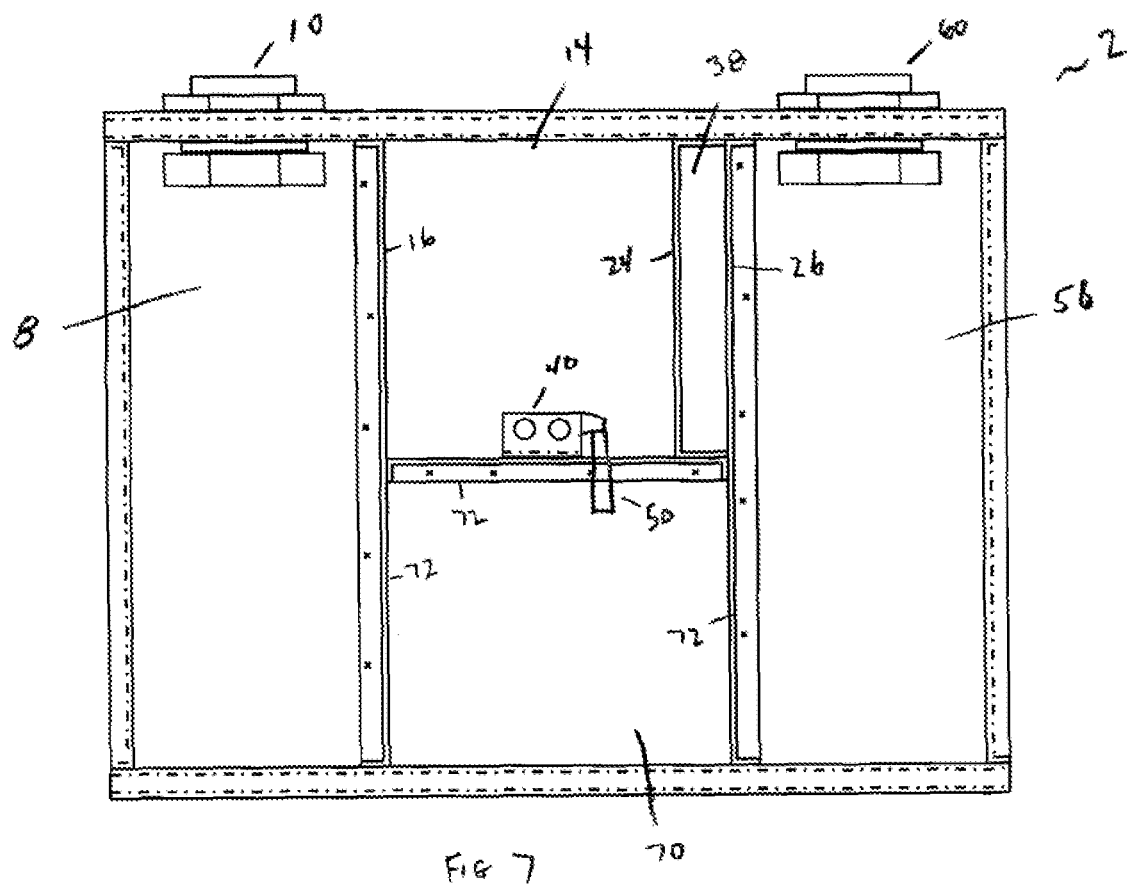

FIGS. 4 through 7 display examples of differing physical arrangements of compartments 8, 14, 38, 56. and 70 of the second embodiment. FOG collection compartment 70 may directly receive removed FOG 30 from FOG discharge chute 50 as depicted in FIGS. 6 and 7, or it may be utilized to hold FOG collection container 52, as depicted in FIGS. 4 and 5.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A FOG interceptor comprising a container having
    an inlet for receiving an effluent and an outlet for discharging the effluent, positioned relative to one another so as to create a positive gravity flow of effluent from the inlet to the outlet;
    a first compartment for removing solids and FOG from the effluent, positioned downstream of the inlet; and
    a second compartment for treating the effluent with biotechnology, positioned downstream of the first compartment and upstream of the outlet,
    wherein the effluent passes through a solid material collector contained with the first compartment, the effluent overflows a weir baffle into the second compartment, and a biotechnology static barrier is positioned between the two compartments for preventing movement of the biotechnology from the second compartment to the first compartment.

2. The interceptor of claim 1 wherein the biotechnology comprises bacterial microbes that reduce BOD demand at a final effluent treatment facility.

3. The interceptor of claim 1 further comprising a lid removably attached to the container.

4. A FOG interceptor comprising a container having
    an inlet for receiving an effluent and an outlet for discharging the effluent, positioned relative to one another so as to create a positive gravity flow of effluent from the inlet to the outlet;
    a first compartment downstream of the inlet for removing solids;
    a second compartment downstream of the first compartment for removing FOG, the first and second compartments separated by a first weir baffle;
    a third compartment downstream of the second compartment for collecting clarified effluent, the second and third compartments separated by a containment baffle which does not extend to a container floor, thereby permitting the effluent to pass from the second compartment to the third compartment beneath the baffle; and
    a fourth compartment downstream of the third compartment and upstream of the outlet for treating the effluent with biotechnology, the third and fourth compartments separated by a second weir baffle;
    wherein the effluent passes through a solid material collector contained with the first compartment, the effluent overflows a weir baffle into the second compartment, the second weir baffle is a biotechnology static barrier for preventing movement of the biotechnology from the fourth compartment into the third compartment and the outlet is positioned to create a tertiary treatment pool.

5. The interceptor of claim 4 wherein the solid material collector is removable.

6. The interceptor of claim 4 wherein the collector extends above the first weir baffle.

7. The interceptor of claim 4 wherein the second compartment includes at least one skimmer for removing separated FOG to a FOG collection container.

8. The interceptor of claim 7 wherein the at least one skimmer is a skimmer selected from the group consisting of a cogged belt skimmer, wheel skimmer, rope skimmer, drum skimmer or combinations thereof.

9. The interceptor of claim 7 wherein the at least one skimmer is a cogged belt skimmer wherein the cogged belt is fabricated from a material having an affinity to collect FOG.

10. The interceptor of claim 4 wherein the second compartment includes a liquid heating element for promoting FOG separation.

11. The interceptor of claim 7 wherein the FOG collection container comprises a FOG collection compartment within the container isolated from the effluent by a liquid impervious containment barrier.

12. The interceptor of claim 7 wherein the FOG collection container is remotely located from the container.

13. The interceptor of claim 7 wherein the skimmer is electrically connected to a timer for predetermined intermittent FOG removal.

14. The interceptor of claim 7 wherein the skimmer is operatively connected to a float switch.

15. The interceptor of claim 4 wherein a top of the second weir baffle is lower than a top of the first weir baffle.

16. The interceptor of claim 4 wherein the inlet and outlet are sized to effectuate a flow rate such that the tertiary treatment pool remains below the top of the second weir baffle.

17. The interceptor of claim 4 further comprising a flow restrictor located upstream of the inlet.

18. The interceptor of claim 4 wherein the biotechnology comprises bacterial microbes that reduce BOD demand at a final effluent treatment facility.

19. The interceptor of claim 4 further comprising a lid removably attached to the container.

20. A method for removing FOG from an effluent source comprising the steps of:
    attaching a FOG interceptor inline between the effluent source and a final treatment facility; and
    passing the effluent through the FOG interceptor;
    wherein the FOG interceptor comprises a container having an inlet for receiving an effluent and an outlet for discharging the effluent, positioned relative to one another so as to create a positive gravity flow of effluent from the inlet to the outlet;
    a first compartment for removing solids and FOG from the effluent, positioned downstream of the inlet; and
    a second compartment for treating the effluent with biotechnology, positioned downstream of the first compartment and upstream of the outlet,
    wherein the effluent passes through a solid material collector contained with the first compartment, the effluent overflows a first weir baffle into the second compartment, and a biotechnology static barrier is positioned between the two compartments for preventing movement of the biotechnology from the second compartment to the first compartment.

21. The method of claim 20 wherein the FOG interceptor further comprises a container having:
    a third compartment downstream of the second compartment, the second and third compartments separated by a containment baffle which does not extend to a container floor, thereby permitting the effluent to pass from the second compartment to the third compartment beneath the baffle; and a fourth compartment downstream of the third compartment and upstream of the outlet for treating the effluent with biotechnology, the third and fourth compartments separated by a second weir baffle;

wherein the second weir baffle is a biotechnology static barrier for preventing movement of the biotechnology from the fourth compartment into the third compartment and the outlet is positioned to create a tertiary treatment pool.

* * * * *